United States Patent [19]

Kinzer et al.

[11] Patent Number: 5,667,893
[45] Date of Patent: Sep. 16, 1997

[54] SUBSTRATE COATED OR IMPREGNATED WITH FLEXIBLE EPOXY COMPOSITION

[75] Inventors: Kevin E. Kinzer, Woodbury; Lowell W. Holland, St. Paul Park, both of Minn.; Krishnamurthy Sridhar, Austin, Tex.; James N. Kellen, Austin, Tex.; Richard W. Pribnow, Austin, Tex.

[73] Assignee: Minnesota Mining and Manufacturing Company, St. Paul, Minn.

[21] Appl. No.: 191,601

[22] Filed: Feb. 4, 1994

Related U.S. Application Data

[63] Continuation-in-part of Ser. No. 958,930, Oct. 9, 1992, abandoned.

[51] Int. Cl.$^6$ .............................. C08G 59/14; B32B 27/38
[52] U.S. Cl. .............. 428/413; 106/287.18; 106/287.22; 428/345; 522/16; 522/22; 522/66; 522/170; 525/524; 528/103
[58] Field of Search ...................... 428/262, 268, 428/269, 290, 308.8, 328, 343, 345, 413; 522/16, 22, 66, 170; 525/524; 528/103; 106/287.18, 287.22

[56] References Cited

U.S. PATENT DOCUMENTS

| Re. 24,905 | 12/1960 | Giffen | 192/18 |
|---|---|---|---|
| 3,018,262 | 1/1962 | Schroeder | 525/524 |
| 3,365,516 | 1/1968 | Prescott et al. | 528/108 |
| 4,060,656 | 11/1977 | Naka | 428/413 |
| 4,181,752 | 1/1980 | Martens et al. | 427/54.1 |
| 4,216,288 | 8/1980 | Crivello | 430/280 |
| 4,230,814 | 10/1980 | Crivello | 526/333 |
| 4,286,047 | 8/1981 | Bennett et al. | 430/280 |
| 4,287,228 | 9/1981 | Schlesinger | 427/54.1 |
| 4,367,251 | 1/1983 | Crivello | 428/413 |
| 4,404,355 | 9/1983 | Eldin et al. | 528/89 |
| 4,503,211 | 3/1985 | Robins | 528/92 |
| 4,694,029 | 9/1987 | Land | 522/8 |
| 4,704,322 | 11/1987 | Roberts | 428/251 |
| 4,707,432 | 11/1987 | Gatechair et al. | 430/281 |
| 4,780,360 | 10/1988 | Kleeberg et al. | 428/413 |
| 4,846,906 | 7/1989 | Tarbutton et al. | 525/65 |
| 5,032,453 | 7/1991 | Rogler et al. | 428/413 |
| 5,073,476 | 12/1991 | Meier et al. | 430/280 |
| 5,089,536 | 2/1992 | Palazzotto | 522/16 |
| 5,102,722 | 4/1992 | Iida et al. | 428/413 |
| 5,147,900 | 9/1992 | Palazzotto et al. | 522/25 |
| 5,160,783 | 11/1992 | Nemoto et al. | 428/413 |

FOREIGN PATENT DOCUMENTS

| 38551/85 | 8/1985 | Australia | C08G 59/68 |
|---|---|---|---|
| 58-002372 | 1/1983 | Japan | C09J 7/02 |
| 61-197869 | 9/1986 | Japan | F16L 3/00 |
| 89 3200 | 1/1989 | South Africa. | |
| 2 071 105 | 9/1981 | United Kingdom. | |
| 82 14609 | 11/1983 | United Kingdom. | |
| WOA9409497 | 4/1994 | WIPO. | |

OTHER PUBLICATIONS

Industrial Polymers, Ulrich, Hanser Publishing Co., Copyright 1982, pp. 91–94.
Photocrosslinking of Epoxy Resins, Advances in Polymer Science, 78, F. Lohse & H. Zweifel, Springer-Verlag Publ., 2986, pp. 61–81 (no date available).

*Primary Examiner*—Marion E. McCamish
*Assistant Examiner*—Blaine R. Copenheaver
*Attorney, Agent, or Firm*—Gary L. Griswold; Walter N. Kirn; Lorraine R. Sherman

[57] ABSTRACT

The present invention relates to an article comprising a substrate which has coated thereon a photopolymerizable epoxy composition containing a plurality of epoxides including at least one selected from the group consisting of bisphenol A epoxides and cycloaliphatic epoxides, and at least one aliphatic epoxide, from about 0.1% to about 2% of at least one organometallic cationic initiator capable of initiating polymerization at wavelengths of from about 200 to about 600 nm, and optionally at least one accelerating agent. The article can be a flexible tape backing or a chip-resistant paint.

7 Claims, No Drawings

SUBSTRATE COATED OR IMPREGNATED WITH FLEXIBLE EPOXY COMPOSITION

This is a continuation-in-part of application Ser. No. 07/958,930, filed Oct. 9, 1992, now abandoned.

BACKGROUND OF THE INVENTION

The present invention relates to an article which can be a backing material for a tape comprising a flexible substrate which is either coated or impregnated with a polymerizable, cationically sensitive composition, or the article can be a substrate coated with a flexible paint comprising a polymerizable, cationically sensitive composition. Polymerization is achieved using an ionic organometallic compound as a photoinitiator.

DESCRIPTION OF THE RELATED ART

The formation of polymerized, crosslinked structures using cationically sensitive species is well known. A variety of methods for polymerizing these species has been disclosed in the prior art, including the polymerization of epoxy materials. The earliest reports of polymerization of epoxy materials relied upon thermal curing using, e.g., polyfunctional amines or anhydrides. See, e.g., Industrial Polymers, Ulrich, Hahset Publishing Co., Copyright 1982, pages 91–94.

Recently, more convenient means of curing epoxies at room temperature have been discovered, i.e., photopolymerization. These methods rely upon generation of reactive species which initiate polymerization without heating. This is accomplished most frequently by using photoinitiators which react to light at specific wavelengths. Photoinitiators for cationically sensitive species reside in three main classes, i.e., aryldiazonium salts; sulfonium salts, iodonium salts, and related compounds, commonly called "onium" salts; and organometallic compounds; see, Photocrosslinking of Epoxy Resins, Advances in Polymer Science 78, F. Lohse & H. Zweifel, Springer-Verlag Publ., 1986, pages 61–81.

The use of epoxy resins in tape backings is also known in the art.

JAP 61197869 discloses the use of compositions containing a blend of epoxy monomers to permeate a porous web or substrate. This impregnated web may be cured to a rigid condition by exposure to an ultraviolet energy source.

JP58002372 discloses the addition of flame retardants to provide this desirable characteristic to cured structures.

U.S. Pat. No. 4,704,322 discloses an epoxy impregnated, electrically insulating tape having three layers. An inner layer of mica flakes is sandwiched between two layers of scrim fabric. The composite structure is coated with a low viscosity, fluid, polymerizable, epoxy composition. The epoxy composition comprises three main ingredients; an epoxy resin, a phenolic accelerator and an organic titanate. Coating is accomplished by brush application of the fluid to the tape. The tape absorbs the fluid thereby becoming impregnated with the epoxy composition. Application of heat converts the tape to a B-staged condition. In this condition the structure is stable under normal storage conditions. When desired, it is possible to convert the electrically insulating tape to a rigid, fully cured condition by the application of heat.

U.S. Pat. No. 5,089,536 discloses the use of organometallic photoinitiators for cationic polymerization of a wide range of polymerizable species. However, it does not address the relative rates of curing when compared with other types of cationic polymerization initiators e.g. diazonium or other "onium" catalysts. Nor does it discuss control of the flexibility of articles, such as porous web materials, which may be impregnated with epoxy compositions which are subsequently cured under the influence of suitable actinic radiation. This reference also teaches that solvents are required to provide epoxy compositions of desired viscosity, which is undesirable.

Also, most prior art backings containing epoxy monomers are relatively unstable and must be used within a short time of addition of a curing agent. They must be further processed after polymerization, usually by heating, in order to develop any shelf stability. This is time consuming, and expensive.

SUMMARY OF THE INVENTION

Briefly, the present invention provides an article comprising a substrate coated with a flexible epoxy composition. The article comprises a substrate which has coated thereon a photopolymerizable epoxy composition comprising a) a plurality of epoxides including at least one selected from the group consisting of cycloaliphatic epoxides and bisphenol A epoxide, and at least one different aliphatic epoxide, b) from about 0.1 to about 2% of at least one organometallic cationic initiator capable of initiating polymerization at wavelengths of from about 200 to about 600 nm, and c) optionally, at least one accelerating agent, wherein the article is a flexible tape backing or a chip resistant paint.

The invention provides electrical tape backings incorporating the polymerized epoxy composition of the invention useful with various adhesives, having controlled flexibility, along with the requisite electrical and handling properties.

Tape backings of the invention comprise a substrate coated or impregnated with a blend of epoxy materials, at least one organometallic photoinitiator, and at least one accelerating agent.

Specifically, the invention provides a tape backing comprising a substrate which has coated thereon a photopolymerized epoxy composition containing a) a plurality of epoxides including at least one selected from the group consisting of cycloaliphatic epoxides and bisphenol A epoxides, and at least one different aliphatic epoxide, b) from about 0.1% to about 2% of at least one transition-metal containing organometallic cationic initiator capable of initiating polymerization at wavelengths of from about 200 to about 600 nm, and c) at least one accelerating agent, wherein said backing is fully cured after an irradiation of from about 1 to about 15 seconds, without a heating step.

Preferred tape backings of the invention comprise a porous substrate, and are therefore impregnated by the photopolymerizable epoxy composition.

In one preferred embodiment of the invention using a polyester substrate, electrical tapes, comprising an adhesive and a flexible backing therefore are provided, said backing comprising a substrate having coated thereon, a) a photopolymerized polymer containing a plurality of epoxides including at least one selected from the group consisting of cycloaliphatic epoxides and bisphenol A epoxides, and at least one different aliphatic epoxide, b) a catalytically-effective amount of at least one organometallic cationic photoinitiator comprising an ionic salt of an organometallic complex cation to effect polymerization, said metal being selected from elements of Periodic Groups IVB, VB, VIB, VII, and VIII (a transition metal), and c) at least one accelerating agent, wherein said tape has a dielectric strength of at least about 3.5 kV to about 10 kV, and an insulating resistance of at least about $1 \times 10^6$ Megaohms.

In all embodiments of the invention, the metal of the organometallic photoinitiator is a transition metal and the organometallic photoinitiator is required to have at least one carbon to metal atom bond.

In another aspect, the invention provides a flexible paint which preferably is an impact resistant, flexible, and chip resistant coating for substrates, preferably metal substrates, and most preferably steel or aluminum substrates, the coating comprising a blend of epoxy material, and at least one organometallic photoinitiator as defined above.

Specifically, the chip resistant coating comprises a photopolymerizable epoxy composition comprising a) a plurality of epoxides including at least one selected from the group consisting of cycloaliphatic epoxides and bisphenol A epoxides, and at least one different aliphatic epoxide, b) from about 0.1% to about 2% by weight of at least one ionic salt of an organometallic cationic initiator comprising a transition metal, the initiator being capable of initiating polymerization at wavelengths of from about 200 to about 600 nm, and c) optionally, at least one accelerating agent, wherein the chip resistant coating is fully cured by irradiation with or without heating.

As used herein these terms have the following meanings.

1. The term "photopolymerizable" means that a compound or composition is capable of polymerizing (i.e., being fully cured) when irradiated preferably by ultraviolet emissions in the range of from about 180 nm to about 420 nm.

2. The term "impregnated" means that a substrate contains porosities which have been filled to the saturation point by the photopolymerizable composition.

3. The term "epoxide" is used to refer to an individual material containing at least one epoxy group. The term "epoxy" is used interchangeably, and also used to refer to a resin containing a blend of epoxides.

The present inventors have now discovered that simplification of the process and an increase in the rate of production of backing materials, as well as backing materials of prescribed flexibility, and in addition chip-resistant paints, can be obtained by the use of a blend of epoxides in combination with certain organometallic photoinitiators. The use of organometallic photoinitiators facilitates the cationic polymerization reaction more effectively than previously disclosed cationic polymerization initiators such as "onium" salts. Preferably the polymer is free of silicon.

Preferred compositions of the current invention are stable even with the photoinitiators present, until exposed to suitable actinic radiation. The invention therefore overcomes problems associated with earlier backings constructions by eliminating the need for solvents and providing a faster, less costly method of manufacture which is free from the time consuming post-curing procedures at elevated temperatures.

It has further been discovered that, by varying the coating or impregnating compositions, it is possible to control the flexibility of the resulting backing materials.

DETAILED DESCRIPTION OF THE INVENTION

Epoxy blends useful in tape backings of the invention can be aliphatic, cycloaliphatic, aromatic or heterocyclic and will typically have an epoxy equivalent of from about 1 to about 6. Particularly useful are the aliphatic, cycloaliphatic, and glycidyl ether type 1,2-epoxides such as propylene oxide, epichlorohydrin, styrene oxide, vinylcyclohexene dioxide, glycidol, butadiene oxide, glycidyl methacrylate, and the like.

Representative epoxides include glycidyl ether of bisphenol A, vinylcyclohexene dioxide, 3,4-epoxycyclohexylmethyl-3,4-epoxycyclohexane carboxylate, 3,4-epoxy-6-methylcyclohexylmethyl-3,4-epoxy-6-methylcyclohexane carboxylate, bis(3,4-epoxy-6-methylcyclohexylmethyl)adipate, aliphatic epoxy modified with polypropylene glycol, dipentene dioxide, epoxidized polybutadiene, silicone epoxy, 1,4-butanediol diglycidyl ethylene, polyglycidyl ether of phenolformaldehyde novolak, resorcinol diglycidyl ether, polyglycol diepoxide, polyacrylate epoxide, urethane modified epoxide, polyfunctional flexible epoxides, and mixtures thereof.

Useful glycidyl ethers of bisphenol A type of epoxy resins include the Epon™ series available from Shell Chemical Co., Houston, Tex. such as EPON 825, EPON 828, EPON 1001F, EPON 1004F, EPON 1007F, and EPON 1009, or their equivalent from other manufacturers, as well as halogenated and hydrogenated versions of the glycidyl ether of bisphenol A epoxy resins such as tetrabromo bisphenol A diglycidyl ether, available as Epirez™ 5163, from Rhone Poulenc, and Eponex™ 1510, available from Shell Chemical Co. Diglycidyl ether of bisphenol A has the formula

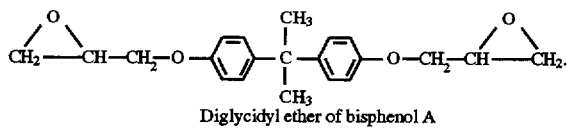

Diglycidyl ether of bisphenol A

Preferred epoxides include 3,4-epoxy cyclohexyl methyl-3,4-epoxycyclohexane carboxylate, bis(3,4-epoxy cyclohexyl)adipate, polyglycidyl ether of an aliphatic polyol, polyglycidyl ether of castor oil, polyglyol diepoxide and tetrabromo bisphenol A glycidyl ether.

Epoxides of the bisphenol A type, when polymerized to the resin form, will form a relatively rigid structure, as will cycloaliphatic epoxides. This may be modified by the addition of multifunctional aliphatic epoxides which, on their own, normally provide pliable cured resin structures. When both types of epoxides are combined in photocurable compositions it is possible to produce cured resin systems with properties intermediate between those of the pure resin systems. Generally, the combination of flexibility (as measured by modulus, using ASTM 628-87) and toughness (as measured by area under a stress-strain curve using ASTM 628-87) superior to either of the components alone can be achieved. Toughness values preferably of at least 4.5 N-m, and more preferably at least 5.0 N-m, using the method of Example 13 below, can be obtained by the cured compositions of the invention, both as a tape backing and flexible paint.

By varying the proportions of cycloaliphatic epoxide or bisphenol A epoxide to aliphatic epoxide, it is possible to provide a range of resin flexibilities from somewhat rigid to quite flexible. These same characteristics of rigidity or flexibility may be imparted to flexible substrates which are either coated with the photocurable compositions or impregnated with them and to flexible chip-resistant paints.

While at least two epoxides are required for control of flexibility it is possible to add others. The additional epoxides may provide other attributes beyond control of flexibility. Such attributes include, e.g. water repellency, flame retardancy, etc. A brominated epoxide, based on bisphenol A, exhibits flame retardant properties. Some flame retardancy of the brominated bisphenol A is conveyed to the composition when it is included with other combinations of epoxides.

Preferred substrates for the chip resistant coatings of the invention are metal, ceramic, glass, and plastic. More preferably the substrate is a metal motor vehicle and most preferably the chip resistant coating protects the lower portion of the vehicle, particularly the rocker panels.

The chip resistant coating preferably comprises in the range of 50 to 98 weight percent of cycloaliphatic or bisphenol A epoxide and in the range of 2 to 50 weight percent of a different aliphatic epoxide.

The uncured flexible paint or chip resistant coating which is 100% solids (solvent free) flows and conforms to surfaces. Generally, no primer is required for adherence to metal surfaces. The uncured coating preferably has a pot life of at least six months in the dark, thereby eliminating the need for two-part mixing of the epoxy formulation. It also provides a longer work time compared to a mixed two-part system. The cured coating has controlled flexibility so as to bend through an angle of at least 90 degrees without cracking and rebounds after impact from stones and pebbles substantially without damage. Preferably, the cured coating has a rating of at least 3C on ASTM-D-3170-87, a chipping resistance test, a rating of at least 2.2 N-m (20 inch/lbs) in a Reverse Impact Test, a tensile strength (ASTM 628-87) in the range of $1 \times 10^3$ to $45 \times 10^3$ kPa, and a modulus of less than $1.00 \times 10^6$ kPa.

The combination of properties exhibited by the curable and cured compositions, both as chip resistant coatings and as tape backings, are superior and surprising compared with epoxies described in the art.

Tape backings and flexible paints of the invention also comprise at least one catalytically-effective amount of an ionic salt of an organometallic complex cation sufficient to effect polymerization, said metal being selected from elements of Periodic Groups IVB, VB, VIB, VIIB, and VIII.

Specifically, the ionic salts having the formula:

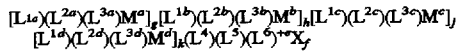

$$[L^{1a})(L^{2a})(L^{3a})M^a]_e[L^{1b})(L^{2b})(L^{3b})M^b]_h[L^{1c})(L^{2c})(L^{3c})M^c]_j$$
$$[L^{1d})(L^{2d})(L^{3d})M^d]_k(L^4)(L^5)(L^6)^{i+}X_f$$

wherein $M^a$, $M^b$, $M^c$, and $M^d$ represent metal atoms which may be the same or different selected from the elements of periodic Groups IVB, VB, VIB, VIIB, and VIII. The photoinitiator may be a mononuclear, binuclear, trinuclear or tetranuclear complex compound comprising the metallic atoms and the attendant ligands, L.

Ligands are provided by any compound having an accessible unsaturated group, i.e., an ethylenic group acetylenic group or aromatic group, which have π-electrons regardless of the total molecular weight of the compound. Such compound must be soluble in a reaction medium for these electrons to be accessible. For further details, see e.g., U.S. Pat. No. 5,089,536, incorporated herein by reference.

Useful compounds include, but are not limited to, cyclopentadienyl iron (II) hexafluoroantimonate, cyclopentadienyl iron (II) hexafluorophosphonate, cyclopentadienyl iron (II) hexafluoroarsenate and the like.

Preferred electrical tape backings of the invention also comprise an accelerating agent such as a peroxide. Optionally, accelerating agents can be used in the flexible paint compositions of the invention. Useful peroxides include cumene hydroperoxide, tributyl hydroperoxide, methylethylketone peroxide, tributyl cumene peroxide, and triphenyl methyl hydroperoxide.

Useful accelerating agents which are known in the art provide a cured resin which is dry to the touch and therefore will not block when converted into roll form. Unless the accelerator is present, it may be necessary to promote complete curing of the epoxy compositions of this invention usually by heating.

Preferred electrical tape backings of the invention also comprise at least one flame retardant. This may be a brominated ether of bisphenol A, as discussed above, or may be an inorganic flame retardant additive, such as various metal oxides and oxide hydrates, as well as nitrogen or phosphorous containing compounds. Preferred flame retardants include, but are not limited to, oxides of antimony in combination with brominated bisphenol A epoxides.

Compositions of the invention may also include optional adjuvants such as co-curatives, hardeners, fillers, plasticizers, pigments, antioxidants, surface modifying agents, and the like, in amounts such that they do not interfere with the photopolymerization of the epoxides.

Optionally, heating may be used to accelerate achieving a dry state.

Useful tape backing substrates for the invention include porous substrates such as glass cloth; papers such as flat back paper, and crepe paper; nonwovens, such as polyester, and cellulose triacetate. Also useful, though less preferred are nonporous substrates, including film-forming polymers, e.g., polyesters, acetates, polyphenylene sulfide, polyimide, and the like.

Tape backings and flexible paints of the invention are made by mixing the epoxides with the photoinitiator, and then coating the photopolymerizable mixture onto a desired substrate and photopolymerizing to a dry state.

The photopolymerization, or curing reaction, for the composites of the invention, will proceed at a faster rate than for compositions lacking the organometallic photoinitiator. When desired, the composite is then fully cured, i.e., irradiated, preferably by exposure to an ultraviolet light having emissions in the range of from about 180 nm to about 420 nm.

The chip resistant paint of the invention which desirably has a viscosity in the range of 0.5 to 10 Pascal-seconds (500 to 10,000 centipoise) can be applied uncured to a substrate by conventional coating methods such as spraying, brushing, rolling, curtain coating, etc.

Materials of this invention are useful as adhesive tapes, electrical tapes or rigid insulating composite structures. Also, compositions of the invention provide a chip resistant, flexible paint that is particularly useful to protect the lower portions of a motor vehicle.

As an adhesive tape, depending on the use desired, one skilled in the art can easily select an adhesive for use with the tape backings of the invention. Useful adhesives include, but are not limited to, rubber resin adhesives, synthetic block copolymers such as styrene-butadiene-styrene, polybutadiene, polyisoprene, styrene-isoprene copolymers, acrylate adhesives such as those disclosed in RE 24,905, incorporated herein by reference and blends of the above, all of which may include tackifiers and other conventional additives. The adhesives may be hot-melt, solution polymerizable, suspension polymerizable, or preferably, ultraviolet radiation polymerizable, such as those disclosed in U.S. Pat. No. 4,181,752, which is incorporated herein by reference.

When an electrical tape is desired, the tape should have a dielectric strength of at least about 3.5 kV to about 10 kV, an insulating resistance of at least about $1\times10^6$ Megaohms. The adhesive may also contain a flame retardant additive such as those described, infra, as useful in the tape backing.

Useful tapes of the invention are made by coating an adhesive mass onto the tape backing by conventional coating methods such as knife coating, gravure coating, meyer bar and the like, and then curing the adhesive by the appropriate means.

TEST METHODS

Adhesion Test

A strip of adhesive tape (2.54 cm×25.4 cm) is applied with adhesive contact to the cleaned and polished surface of a Type 302 steel plate (5 cm×12.2 cm×0.16 cm). Constant pressure is applied to the tape strip by slowly rolling a 2 kg rubber coated steel roller two passes over the plate at a speed of 5 cm/sec. Approximately 12.2 cm of tape extends beyond one end of the steel plate. The adhesive tape is then conditioned for 20 mins. Adhesion measurement requires that the steel plate is positioned with its length vertically disposed. The tape extension hangs from the lower edge of the plate. The end of the tape extension, farthest away from the steel plate, is folded to cause adhesive-to-adhesive contact and form a tab of approximately 2.54 cm long. By grasping this tab and lifting vertically, a U-shaped loop, with adhesive on the outer face of the U, may be formed. Further application of force produces tension in the tape loop and causes the tape to separate or peel back from the steel plate. When approximately 1.27 cm of tape has peeled back, the lower end of the steel plate is centrally clamped in the lower jaw of a tensile testing machine, i.e., INSTRON™ Model TM. The 2.54 cm tab is clamped in the upper jaw of the tester. The lower jaw is held in a fixed position while the upper jaw is raised at a speed of about 30.5 cm/min.

The average force registered during removal of the tape from the steel plate provides the measure of adhesion to steel.

Two-Bond Adhesion

A 2.54 cm×12.7 cm strip of double-coated adhesive test tape on a release liner is placed lengthwise, located centrally along a cleaned steel panel (5.1 cm×12.7 cm×0.13 cm). The unprotected adhesive coating is used for attachment to the steel plate. The steel panel is placed on a flat surface with the test tape visible on the upper surface of the plate. A 2 kg rubber coated roller is used to apply constant pressure to the tape by rolling along the release liner for several passes.

A single-coated specimen tape (2.54 cm×12.7 cm), which is subject to property measurement, is prepared for attachment to the test tape. The opposite side of the backing is wiped with a degreasing solvent, and then the release liner is removed from the test tape. The specimen tape is applied lengthwise so that the degreased side is in contact with the newly exposed adhesive surface of the test tape. 7.62 cm strips of a single sided, aggressive adhesive, tape are placed across the width of each end of the steel panel and the specimen tape to hold it in position. An additional strip 30.5 cm long×1.27 cm wide is placed lengthwise in adhesive-to-adhesive contact such that approximately 15 cm of the aggressive adhesive tape extends beyond one end of the steel panel. Since the specimen tape is wider than the aggressive adhesive tape, exposed fields of adhesive extend on either side of the latter. These adhesive fields are protected by adhesive-to-adhesive application of strips (12.7 cm long× 1.27 cm wide) of the aggressive adhesive tape. The resulting layered tape structure is compressed with several passes of the 2 kg roller in either direction.

The steel panel is placed with its longitudinal axis in a vertical orientation with the aggressive tape extension hanging from its lower end. The end of the tape, furthest from the plate, is folded back in adhesive contact with itself to form an end tab approximately 1.27 cm long. By grasping this tab and lifting vertically, a U shaped loop is formed with adhesive on the outer face of the U. Further application of force produces tension in the tape loop and causes the aggressive adhesive tape to urge 100% removal of adhesive from the specimen tape. Application of this force is maintained until the tapes are separated for a distance of approximately 2.54 cm. At this point the lower edge of the steel panel is placed in the lower jaw of a tensile testing machine, i.e., INSTRON™ Model TM, and the tab of the tape loop is placed in the upper jaws of this tester.

The force required for separating the specimen and aggressive adhesive tapes for an additional distance of 5 cm is measured as the lower jaw of the test machine is withdrawn relative to the fixed upper Jaw.

Tensile, Elongation, Modulus and Toughness Test Method: ASTM 628-87

Tensile at Break—the stretching force, per unit width, at which a linear test sample fails and ruptures into two distinctly separate portions.

Elongation—comparison of the increase in length of a stretched versus an unstretched test sample at the instant that the sample breaks under the applied stretching force.

A sample of backing material 17.8 cm long×2.54 cm wide is placed between the jaws of an Instron™ TM tensile tester with the longitudinal axis in a vertical orientation such that one end of the sample may be clamped in the upper jaw of the tensile tester and the opposite end of the sample in the lower jaw of the tester.

The test is run by separating the jaws of the tester at 30.5 cm per minute. As the sample stretches, the force applied is increased to a level at which failure and rupture occurs in the central portion of the sample. Measurement of tensile is obtained by determining the maximum force per unit width just before failure. Elongation is measured as the percent increase in length of the sample, under maximum load, before failure.

Toughness—the area under the tensile versus elongation curve up to the point of failure.

Reverse Impact Test

Test panels were prepared by coating and curing the composition of interest onto 810 micrometer thick cold rolled steel panels. The test panels were then subjected to various N-m impact conditions from the reverse (uncoated) side of the panel using a Gardner 18 N-m (160-inch-pound) capacity impact testing machine. A coating was considered to pass this test at a given impact condition if there was no visual indications of cracking, flaking or adhesion failure of the coating.

Chipping Resistance Test

Test panels were prepared by coating and curing the composition of interest onto 810 micrometer thick cold rolled steel panels. Standardized road gravel was projected by means of a controlled air blast at the coated specimens, as prescribed in ASTM D-3170-87. Generally the test conditions were made more severe by performing the test at low temperature conditions. The resultant chipping effect was evaluated by comparison with a set of photographic standards that appear in the *Pictorial Standards Coating Defects*, available from the Federation of Societies for Coating Technology, 492 Norristown Rd., Blue Bell, Pa. 19422.

Roll Unwind Test

A roll of adhesive tape of the invention having a width of 2.54 cm is wound on to 7.62 cm ID cores and limited in length so that the roll diameter does not exceed 16.5 cm. Using a modified tensile tester, Thwing-Albert, Intelect 500 TA, the force to unwind a roll of this tape is measured as follows.

Initially, five laps of tape are unwound from the adhesive roll and discarded. The roll of tape is then placed over an unwind mandrel which is of a size to accommodate the 7.62 cm core, located on the front of the tensile tester. A length of tape is unwound and adhesively attached to a drive roller. The longitudinal axes of unwind mandrel and drive roller are parallel and they are positioned at approximately the same height. Between the unwind mandrel and the drive roller, the tape adopts the form of an inverted U, the apex of which is supported on but not in adhesive contact with the surface of a freely rotating cylinder. This cylinder is attached to the load cell of the tensile tester, and has a diameter similar to that of the adhesive tape roll. The freely rotating cylinder is positioned above, midway between and in the same vertical plane as the unwind mandrel and the drive roller. With the drive roller in motion, the tape is pulled from the roll of adhesive tape. The force, generated during unwind, between adhesive and backing, is transmitted to the rotating cylinder and thence to the force sensing load cell. During smooth operation of the drive roller (1.27 m/min) over a pre-selected cycle time the force transmitted to the load cell is measured and converted to a number for tape unwind.

Dielectric Breakdown Determination

A specimen 15.25 cm in length×2.54 cm in width is cut from a roll of tape, and one end is inserted between the electrodes of a dielectric tester, e.g., one capable of increasing voltage at a uniform rate of 0.5 kv/sec, with the adhesive surface contacting the upper electrode. The voltage control, Variac, is then zeroed, and the circuit breaker is reset. The tester is then initialized such that the voltage potential across the specimen will increase until the flow trips the circuit breaker. The voltage at which the dielectric breakdown occurs is then recorded. The procedure is repeated at the opposite end of the specimen and at the center. The average of the three individual breakdown voltages is then recorded.

Insulative Resistance Measurement

This test requires 12 polished stainless steel electrodes 0.64 cm×0.64 cm×2.54 cm with rounded edges mounted on a solvent cleaned methylmethacrylate test board about 2.54 cm apart. (For further information on the test board, see ASTM D-1000). Several outer wraps are discarded from a roll of tape, and a 23 cm sample is cut. This sample should be handled carefully so that the inner two-thirds is not touched. The sample is placed adhesive side down on top of six cleaned electrodes, and a second set of electrodes and retaining clips are placed thereon to form a sandwich. Any excess sample is then cut off, and the test board is placed on a test chamber capable of maintaining 96% relative humidity at 23° C. with the adhesive toward a glycerine solution having refractive index of about 1.336–1.34. Condition the specimen for 18 hours at 23° C. and 50% RH. Attach a megometer to the test board, and set at 120V. Measure insulation resistance across each pair of electrode terminals (total 5 readings). Record the average insulation resistance in megaohms.

Flammability

The flammability test involves wrapping a film strip around a wire with a 50% overlap and repeating with another film strip in the opposite direction. The wrapped wire is exposed to an open flame for 30 seconds. The flame is removed and the burn time of the film is measured. Desirable flame retardance would be exhibited by a material that does not begin to burn, or self extinguishes in less than 4 seconds.

The following examples are meant to be illustrative, and are not intended to limit the invention. Persons skilled in the art will easily discern variations within the scope of the invention, which is defined by the claims.

EXAMPLES

Example 1

A three necked, round bottom flask having a stirrer and thermometer was charged with 60.0 gm bis(3,4-epoxycyclohexyl)adipate, available as "ERL 4299", from Union Carbide Inc., and 40 gm polyglycidyl ether of an aliphatic polyol, available as "Heloxy 84", from Rhone Poulenc. This mixture was stirred while being heated to 75° C., and then maintained at this temperature. The photoinitiator, 1.0 gm ($\eta^5$-cyclopentadienyl)($\eta^6$-xylene)iron (1+) hexafluoroantimonate, was added to the flask. Stirring of the contents continued for one hour with the temperature controlled at 75° C. The hot fluid composition was filtered, and allowed to cool to room temperature. Just prior to coating, 1.5 gm cumene hydroperoxide, available from Atochem, was added. The coating composition had a viscosity of <1000 cps. It was applied to a substrate of glass-cloth, "Burlington Glass Fabric—Style I8026". The fluid composition was absorbed by the glass cloth, impregnating the whole structure with epoxy fluid. The impregnated glass cloth was subjected to ultraviolet rays in the range of 180–420 nm, for a period of <10 secs using an American UV Company mini-conveyorized curing system, having variable lamp intensity and speed control. The resulting backing material was tested to determine its tensile, elongation and electrical insulation characteristics. These values are shown in Table 1.

TABLE 1

| Insulation Resistance (ohms) | Tensile N/cm | Elongation Percent |
|---|---|---|
| $3 \times 10^{14}$ | 330 | 5.4 |

This glass cloth backing material was further coated with a rubber based adhesive. This adhesive tape is useful for applications where tape is used for electrical insulation. Measurements, from this tape, of adhesion to steel and unwind are shown in Table 2.

TABLE 2

| | Adhesion to Steel N/dm | Roll Unwind gms/cm |
|---|---|---|
| Glass Cloth Backing | 16.6 | 248.4 |

Examples 2–3

The epoxy fluid of example 1 was coated separately on crepe paper, available as "M-2251" from Mosinee Paper Corporation, Mosinee Wisc., and flat-back paper, available as "#525" from Lydell, Inc., Troy, N.Y. Insulation resistance, tensile and elongation for these were tested as described above, the results are shown in Table 3.

TABLE 3

|  | Insulation Resistance (ohms) | Tensile N/cm | Elongation percent |
|---|---|---|---|
| Crepe Paper | $5 \times 10^{13}$ | 414 | 7.9 |
| Flatback Paper | $8 \times 10^{10}$ | 58 | 13.9 |

These backings were also coated with rubber based adhesives, and tested for adhesion and roll unwind. The results are shown in Table 4.

TABLE 4

|  | Adhesion to Steel N/dm | Roll Unwind gms/cm |
|---|---|---|
| Crepe Paper | 23.9 | 173 |
| Flatback Paper | 28.3 | 215 |

Example 4

A flame retardant backing of this invention was prepared by including a flame retardant polymer and a flame retardant pigment in the coating composition.

The composition contained 40.0 gms "ERL 4299", 30.0 gms "Heloxy 84", 30.0 gms Tetrabromo Bisphenol A Diglycidyl Ether, available as Epirez 5163, from Rhone Poulenc, 4.0 gms ultrafine grade antimony trioxide, available from Laurel Industries, 1.0 gm photoinitiator and 1.4 gms cumene hydroperoxide. This composition was applied to a non-woven polyester substrate and subjected to 180 nm to 420 nm radiation from an ultraviolet light source.

The resulting backing material was tested using UL™ (Underwriters Laboratory), 510 flame test. An average time of 14 seconds was required to extinguish the flame.

Examples 5 and 5C

The following coating compositions were prepared as in Example 1, except that the photoinitiator was varied.

|  | Example 5 | Example 5C |
|---|---|---|
| ERL 4299 | 40.0 gm | 40.0 gm |
| Heloxy 84 | 30.0 gm | 30.0 gm |
| Epirez 5163 | 30.0 gm | 30.0 gm |
| Antimony Trioxide | 4.0 gm | 4.0 gm |
| Photoinitiator | 1.0 gm[1] | 3.0 gm[2] |
| Cumene Hydroperoxide | 1.0 gm | 0.0 gm |

[1]Cyclopentadienyliron(II)xylene hexafluoroantimonate
[2]FX 512 - a sulfonium hexafluoroantimonate Using continuous coating, exposing and wind-up equipment, examples 5 and 5C were applied separately to samples of non-woven polyester substrate material. The epoxy coated web was transported at 180 cm/min past a UV light station, which emitted radiation in the range of 180 nm to 420 nm at an intensity of 200 watts/in. Example 5, a composition of the present invention, provided a fully cured backing which was dry to the touch. Conversely, Example 5C, a composition outside the scope of the invention, did not cure fully and remained tacky.

The web speed was then reduced to half the original speed, i.e., 90 cm/min, with the lamp conditions unchanged. Example 5C failed to cure completely; Example 5 was fully cured. This demonstrates that compositions of the present invention cure more rapidly than those using catalysts of the "onium" type which have been reported previously. The backings were aged at 100° C. for 10 minutes, to completely cure Example 5C, and tested for tensile and elongation. The results are shown in Table 5.

TABLE 5

|  | Tensile Strength N/cm | Elongation Percent |
|---|---|---|
| Example 5 | 58 | 26.00 |
| Example 5C | 39 | 35.50 |

Examples 6–9

These examples were made according to the procedure of Example 1 except that the epoxy ratios were varied as indicated in Table 6, and the backings were a carded nonwoven polyester web having a thickness of 0.07 mm.

These backings were coated with a tackified natural rubber adhesive and an isooctyl acrylate/acrylic acid/methyl acrylate adhesive (7 and 8), and tested for adhesion, tensile and elongation, and flammability. The results are shown in Table 6.

TABLE 6

|  | EXAMPLE NUMBER | | | |
|---|---|---|---|---|
| COMPOSITION | 6 | 7 | 8 | 9 |
| ERL 4299 - Epoxy | 70 | 60 | 50 | 40 |
| Epirez 5163 - Flame Retardant | 30 | 30 | 30 | 30 |
| Heloxy 84 - Epoxy | 0 | 10 | 20 | 30 |
| Photoinitiator[1] | 1 | 1 | 1 | 1 |
| Cumene Hydroperoxide | 1.5 | 1.5 | 1.5 | 1.5 |
| Antimony Trioxide | 4 | 4 | 4 | 4 |
| Tensile (N/cm) | 60 | 58 | 60 | 58 |
| Elongation (Percent) | 4 | 13 | 25 | 25 |
| 2-Bond Adhesion (N/dm) | 133 | 133 (105*) | 140 (106*) | 111 |
| Adhesion (N/dm) | 43 | 46 (49*) | 43 (49)* | 39 |
| Dielectric Constant (kV) | 5.1 | 4.9 (4.3*) | 4.7 (5.7*) | 5.0 |
| Insulation Resistance (Ohms) | $1.2 \times 10^{13}$ | $2.9 \times 10^{12}$ | $3.3 \times 10^{11}$ | $2.0 \times 10^{10}$ |
| Thickness (μm) | 135 | 127.5 | 127.5 | 130 |
| Flammability (secs) | 13 | 23 | 34 | <20 |

[1]Cyclopentadienyliron (II) xylene hexafluoroantimonate
*Asterisked values were obtained from tape constructions having an acrylate adhesive.

Example 10

The following components were combined and manually stirred while being kept in the dark:

35 gram—bis(3,4-epoxycyclohexyl) adipate, available as "ERL 4299" from Union Carbide 15 gram—polyglycidyl ether of an aliphatic polyol, available as "Heloxy 84" from Rhone Poulenc 0.5 gram—bis($\eta^6$-mesitylene)iron(2+) hexafluoroantimonate, photoinitiator, dissolved in methyl ethyl ketone.

The formulation was knife coated at approximately 250 micrometers thick onto 810 micrometer thick unpolished cold rolled steel panels electrospray coated with ED-11™ primer (as received from Advanced Coating Technologies, Hillsdale, Mich.) and cured by photolyzing for 5 minutes at room temperature under 6 Philips TLD 15W/03 Super Actinic Fluorescent bulbs followed by heating in a 100° C. oven for 20 minutes. The coatings were tack-free and demonstrated good adhesion to the panels and flexibility as demonstrated by subjecting the panel to a 90° bend with no cracking of the coating or delamination. The resulting coated panels were subjected to Chipping Resistance testing (per ASTM D3170-87) at −29° C. and both room temperature (~22° C.) and −29° C. reverse impact testing and determined to demonstrate the properties shown below.

| Test | Results |
| --- | --- |
| Chipping Resistance at −29° C. | 6A rating |
| Reverse Impact at room temperature | >9.0 N-M |
| Reverse Impact at −29° C. | >9.0 N-M |

This example demonstrates the utility of this invention in producing coatings which show good adhesion to metal substrates, excellent low temperature chip resistance, and excellent impact resistance.

Example 11

The following three formulations were prepared by combining the components listed below and manually stirred while being kept in the dark:

A)
70 parts by weight ERL 4299
30 parts by weight Heloxy 84
2.0 parts by weight ($\eta^5$-cyclopentadienyl)($\eta^6$-xylene)iron (1+)hexafluoroantimonate dissolved in methyl ethyl ketone
3.0 parts by weight cumene hydroperoxide B) Formulation A) with 10 wt % silica, available as "SuperFlex 100" from Specialty Minerals Inc., Adams, Mass.

C) Formulation A) with 20 wt % "SuperFlex 100" silica.

The formulations were knife coated at approximately 152 micrometers thick onto three different steel panels: (i) 810 micrometer thick polished cold rolled steel panels, (ii) 810 micrometer thick unpolished cold rolled steel panels, and (iii) 810 micrometer thick unpolished cold rolled steel panels electrospray coated with ED-11 primer, all as received from Advanced Coating Technologies, Hillsdale, Mich. The coated panels were photolyzed for 15 minutes at room temperature under 6 Deluxe Cool White fluorescent bulbs. All of the coatings appeared to be fully cured out of the lights. The panels were placed in a 60° C. oven for approximately 16 hours and then tested for reverse impact performance. The results are tabulated below.

| Substrate | Formulation A | Formulation B | Formulation C |
| --- | --- | --- | --- |
| polished steel | 4.5 N-m | 4.5 N-m | 4.5 N-m |
| unpolished steel | 7.9 N-m | 5.6 N-m | 7.9 N-m |
| e-primed steel | 4.5 N-m | 5.6 N-m | 5.6 N-m |

This example demonstrates that the addition of fillers and additives such as silica does not significantly decrease the flexibility and impact resistance of the flexible paints of this invention, even when coated onto steel panels with various surface preparations.

Example 12

The following two formulations were prepared by combining the components listed below and manually stirred while being kept in the dark:

Formulation A:
90 parts by weight ERL 4299
10 parts by weight Heloxy 84
1.0 parts by weight ($\eta^5$-cyclopentadienyl)($\eta^6$-xylene)iron (1+)hexafluoroantimonate dissolved in methyl ethyl ketone Formulation B:
Formulation A with the addition of 1.0 parts by weight cumene hydroperoxide.

The viscosity of these formulations were monitored by using a Brookfield Model RVT Viscometer equipped with a #4 spindle by measuring viscosity after being stored for various times in a light container. The measured viscosity of these formulations is tabulated below.

| Time (days) | Formulation A | Formulation B |
| --- | --- | --- |
| initial | 0.80 Pa-sec | 0.69 Pa-sec |
| 23 | 0.86 Pa-sec | 0.80 Pa-sec |
| 39 | 0.80 Pa-sec | 0.78 Pa-sec |
| 74 | 0.83 Pa-sec | 0.80 Pa-sec |
| 276 | 0.96 Pa-sec | 0.90 Pa-sec |

This example shows that the uncured coating has a pot-life in excess of 276 days (>9 months) when stored in the dark. This eliminates the need for two-part mixing of the epoxy formulation.

Example 13

Formulations were prepared using the procedure of Example 1 by combining ERL 4299 and polyglycol diepoxide, available as "Heloxy 502" from Rhone Poulenc, France, at various ratios with 1.0 parts by weight ($\eta^5$-cyclopentadienyl)($\eta^6$-xylene)iron(1+) hexafluoroantimonate and manually stirring while being kept in the dark.

The epoxy formulations were irradiated with a 275 watt sunlamp from a distance of approximately 10 cm for 4 minutes while stirring. The formulations were degassed for 5 minutes using a vacuum dessicator and then poured into molds. The molds were heated at 120° C. for 12 to 15 hours and then allowed to cool to room temperature at which time the specimens were removed from the molds. The resulting dog-bone specimens were 1.27 cm wide and 0.317 cm thick. The specimens were tested for tensile, elongation, modulus and toughness, as measured by the area under the stress versus strain curve, using a gage length of 11.43 cm and a cross-head speed of 0.635 cm/min. The results are tabulated below:

| ERL 4299 | Heloxy 502 | Tensile Strength (kPa) | Elongation at Break (%) | Modulus (kPa) | Toughness (N-m) |
| --- | --- | --- | --- | --- | --- |
| 100* | 0 | 40.7 × 10³ | 4.6 | 1.01 × 10⁶ | 3.87 |
| 90 | 10 | 42.5 × 10³ | 5.1 | 0.99 × 10⁶ | 5.92 |
| 80 | 20 | 36.3 × 10³ | 6.3 | 0.81 × 10⁶ | 5.22 |
| 70 | 30 | 18.3 × 10³ | 10.8 | 0.45 × 10⁶ | 6.19 |
| 60 | 40 | 2.4 × 10³ | 14.0 | 0.03 × 10⁶ | 0.91 |
| 50 | 50 | 1.2 × 10³ | 9.2 | 0.01 × 10⁶ | 0.30 |
| 0 | 100(*)(**) | — | — | — | — |

*Comparative example.
**did not provide a handleable film.

Toughness initially increased with increasing flexibilizer level and then decreased significantly at flexibilizer levels of 40 parts or greater. At the same time the flexibility of the cured material, as determined from modulus measurements, decreased with increasing flexibilizer level. This example shows that the cured coatings of this invention demonstrate a combination of physical properties, namely toughness and flexibility, which are superior to the components alone.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article comprising a substrate which has coated thereon a photopolymerizable epoxy composition consisting essentially of:
   a) at least one epoxide selected from the group consisting of cycloaliphatic epoxides, and at least one epoxide selected from the group consisting of acyclic aliphatic epoxides, and
   b) from about 0.1 to about 2% by weight of at least one ionic salt of an organometallic cationic photoinitiator capable of initiating polymerization at wavelengths of from about 200 to about 600 nm,
   wherein said photopolymerizable epoxy composition is cured to form a chip resistant coating or paint on said substrate.

2. A paint film consisting essentially of:
   a) at least one epoxide Selected from the group consisting of cycloaliphatic epoxides, and at least one epoxide selected from the group consisting of acyclic aliphatic epoxides, and
   b) from about 0.1 to about 2% by weight of at least one ionic salt of an organometallic cationic photoinitiator capable of initiating polymerization at wavelengths of from about 200 to about 600 nm,
   wherein said film is cured to form a coating having controlled flexibility and chip resistance.

3. The paint film according to claim 2 comprising a cycloaliphatic epoxide containing at least one epoxycyclohexyl group and a different acyclic aliphatic epoxide.

4. The paint film according to claim 2 wherein said photoinitiator is an ionic salt of an organometallic complex cation present in an amount sufficient to effect polymerization, said metal being selected from elements of Periodic Groups IVB, VB, VIB, VIIB, and VIII.

5. A motor vehicle comprising the paint film according to claim 2 on at least a portion thereof.

6. A chip-resistant paint film comprising a photopolymerizable epoxy composition consisting essentially of
   a) at least one epoxide selected from the group consisting of cycloaliphatic epoxides, and at least one epoxide selected from the group consisting of acyclic aliphatic epoxides, and
   b) from about 0.1 to about 2% by weight of at least one ionic salt of an organometallic cationic photoinitiator capable of initiating polymerization at wavelengths of from about 200 to about 600 nm.

7. An article comprising a substrate having coated on at least a portion thereof a photopolymerizable epoxy composition consisting essentially of:
   a) at least one epoxide selected from the group consisting of cycloaliphatic epoxides, and at least one epoxide selected from the group consisting of acyclic aliphatic epoxides,
   b) from about 0.1 to about 2% by weight of at least one ionic salt of an organometallic cationic photoinitiator capable of initiating polymerization at wavelengths of from about 200 to about 600 nm, and
   c) at least one of accelerating agents, fillers, plasticizers, pigments, antioxidants, and surface modifying agents,
   wherein said epoxy composition is cured to form a chip resistant coating or paint.

* * * * *

UNITED STATES PATENT AND TRADEMARK OFFICE
CERTIFICATE OF CORRECTION

PATENT NO. : 5,667,893

DATED : September 16, 1997

INVENTOR(S) : Kinzer et al.

It is certified that error appears in the above-identified patent and that said Letters Patent is hereby corrected as shown below:

On the title page, item [75] Inventors: delete "Richard W. Pribnow, Austin, Tex,"

Signed and Sealed this

Thirty-first Day of August, 1999

Q. TODD DICKINSON

*Attest:*

*Attesting Officer*       Acting Commissioner of Patents and Trademarks